United States Patent [19]
Bolie

[11] 4,293,279
[45] Oct. 6, 1981

[54] VERTICAL AXIS WIND TURBINE

[76] Inventor: Victor W. Bolie, 7504 American Heritage, Albuquerque, N. Mex. 87109

[21] Appl. No.: 129,833

[22] Filed: Mar. 13, 1980

[51] Int. Cl.³ .............................................. F03D 3/06
[52] U.S. Cl. ........................... 416/227 A; 416/196 A; 416/197 A
[58] Field of Search ........... 416/227 A, 197 A, 196 A

[56] References Cited

U.S. PATENT DOCUMENTS 4,130,380 7/1977 Kaiser ............................ 416/227 A
4,204,805 5/1980 Bolie ........................... 416/197 A X Primary Examiner—Everette A. Powell, Jr.
Attorney, Agent, or Firm—Head & Johnson

[57] ABSTRACT

A vertical axis wind turbine is provided based on my co-pending application Ser. No. 890,998, filed Mar. 28, 1978, now U.S. Pat. No. 4,204,805. In this improved system the centrifugal forces of rotation produce no bending moments in the air foil spars. Also, the center of mass, the center of useful aerodynamic pressure and the center of main bearing supported are located at the same point to the support structure.

30 Claims, 11 Drawing Figures

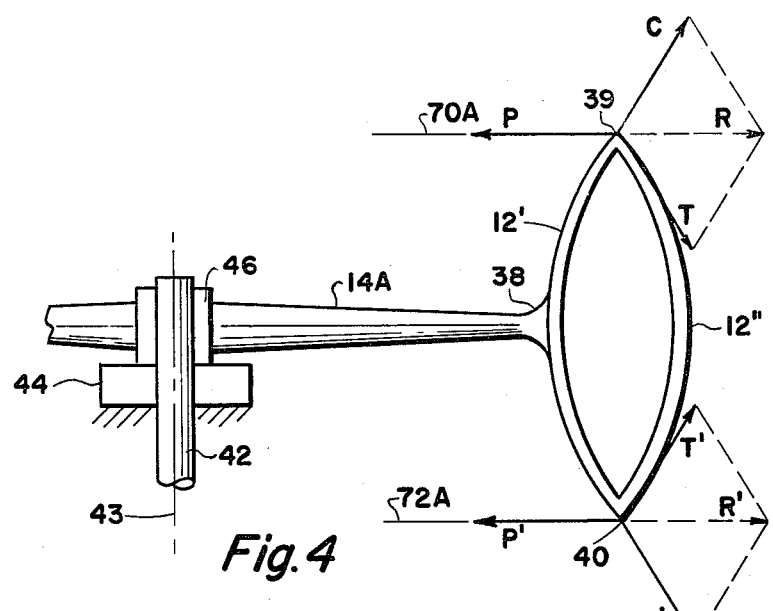
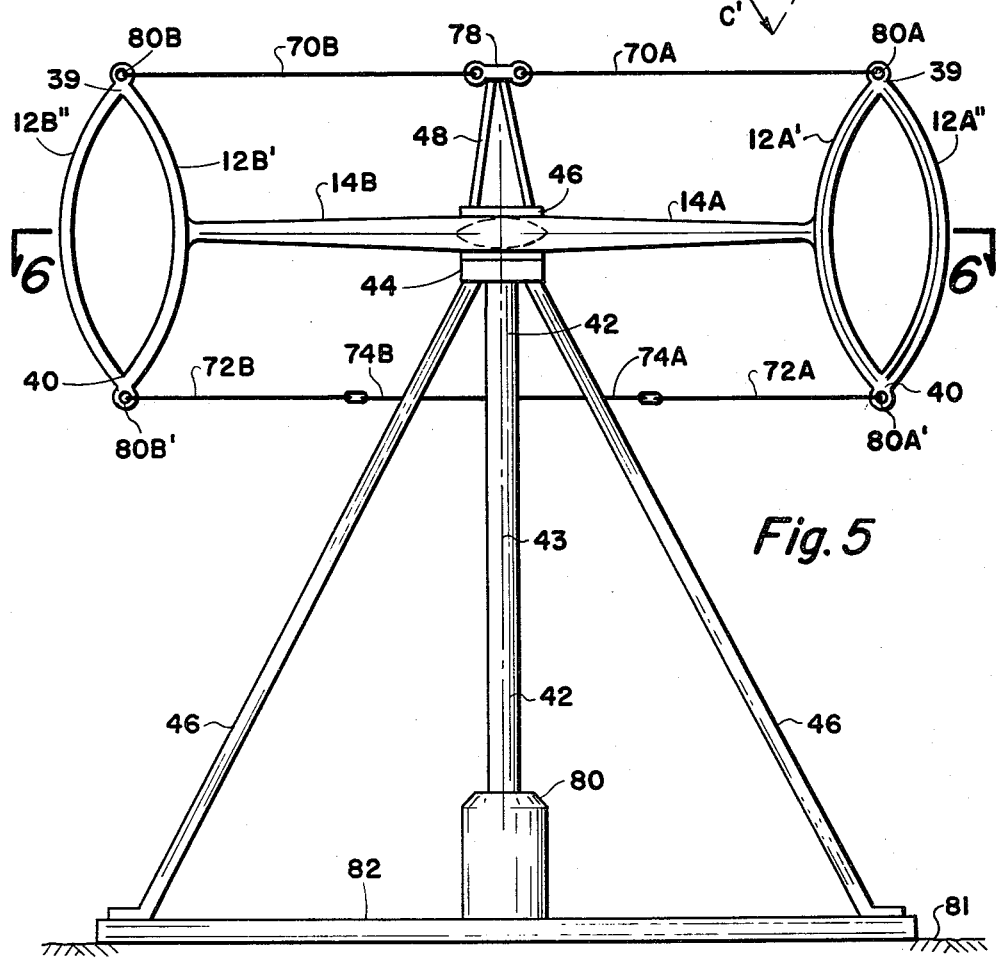
Fig. 4
Fig. 5

VERTICAL AXIS WIND TURBINE

CROSS-REFERENCE TO RELATED APPLICATION

This invention is related to and is a continuation-in-part of my co-pending application Ser. No. 890,998, filed Mar. 28, 1978, entitled "VERTICAL AXIS WIND TURBINE", now U.S. Pat. No. 4,204,805. Ser. No. 890,998 is included by reference into this application.

BACKGROUND OF THE INVENTION

1. Field of the Invention

This invention is generally related to vertical axis windmills, or wind turbines, and is particularly related to a vertical axis wind turbine rotor structure.

2. Description of the Prior Art

A highly desirable feature for the rotor of a vertical-axis wind turbine is a sturdy resistance against centrifugal forces tending to bend the airfoil segments, and against gust moments tending to bend the vertical shaft. A major disadvantage of the conventional hoop-shaped Darrieus rotor is that it cannot be supported by a single main bearing at or near its center of mass; the otherwise severe shaft-bending moment is usually avoided by fastening the hoop segments to a hollow vertical tube which fits rotatably on a vertical pole having its upper end stabilized by guy wires slanting downward to ground anchors located far outside the rotor diameter.

One method of more efficiency utilizing the available ground space is to align coaxially in a suitable tower a vertical shaft extending upward through a tower-top thrust bearing to terminate in a balanced-Tee attachment to the underside of a long, horizontal beam having a vertical airfoil fitted at each end. However, this method has the disadvantage of generally severe centrifugal forces acting to bend the airfoils outward, unless the rotor speed and efficiency are reduced by cyclically weathervaning the airfoils. For example, in a 30 m.p.h. wind the centrifugal acceleration of non-weathervaned airfoils on a rotor of 50 ft. diameter is approximately 1936 ft. sec$^{-2}$, or 60 times the acceleration of gravity. Sample calculations for this loading, using an 8×8 inch 6061-T6 aluminum I-beam as the airfoil spar, show that the cantilevered portion of the airfoil cannot be made longer than 7 feet without exceeding the 8000 psi unit-fiber yield strength.

SUMMARY OF THE INVENTION

It is a primary object of this invention to provide a design for a vertical axis windmill (VAWM) or vertical axis wind turbine (VAWT), having a rigid rotor of diameter equal to or greater than that of the circular ground space required for the tower and its guy wires.

A further object of this invention is to provide the design of a rigid VAWT rotor structure having its center of mass, its center of useful aerodynamic pressure, as the center of its main support bearing, all located at the same point.

A still further object of this invention is to provide a centrally supported VAWT rotor structure in which the inherently strong centrifugal forces produce no bending moments in the airfoil spars.

These and other objects are realized and the limitations of the prior art are overcome in this invention by providing a VAWT which includes a tower structure supported on the earth, and a vertical shaft supported inside of the tower structure, supported from a principal bearing means at the top of the structure. A rotor structure has a central hub which is attached to the vertical shaft, and is supported by the top bearing. The structure comprises at least two radial arms, although three, four or more arms could be used. The arms are equally spaced circumferentially in the horizontal plane. The radial arms each extend from the hub, and carry at their outer extremities, an oval ring airfoil system, which is attached symmetrically to the ends of each of the arms of the rotor system.

Each of the oval ring airfoil systems is identical to the others, and comprises two thin symmetric airfoils. A distinguishing feature of the airfoil design is that in each airfoil the longitudinal spar which extends perpendicular to the cross-section of the airfoil is curved in the form of an arch. The curved shape of the arch is chosen so that the strong centrifugal forces acting on the various segments of the spar comprising the airfoil, produce no bending moments in the spar.

Each of the oval ring airfoil systems comprises two similar airfoils, bent in the form of an arch in which the inner airfoil is concave outward and the outer airfoil is attached to the inner airfoil at its top and bottom extremities, and is convex outward. Thus, there is an oval section in the vertical plane passing through the rotor arm and through the airfoil system.

The extremities of the airfoil spars above and below the plane of the rotor arms are guyed by tension means, such as flexible cables, from the top of one airfoil system radially inwardly to a similar airfoil on the opposite arm of the rotor. Conversely, the tension member may be attached to the upper end of each of the airfoil systems, and then attached also to the top of the rotating arm which carries that airfoil, at a selected distance radially outwardly from the axis of rotation.

When there are two arms at 180° from each other, the tension members attached to the lower extremities of the spars would be attached as previously explained with the upper tension members, to the underside of the rotating arms. If there are three rotating arms, for example, then the tension members could be connected radially inward from the lower tips of each of the airfoil system spars to a triangle of tension members, made of three equal lengths of tension material, which surrounds the tower structure at the level of the lower tips of the spars.

Various additions to the simple rotor structure described such as the various elements which are fully described in Ser. No. 890,998, which is entered as part of this invention, may be added to the airfoil systems which comprise the basic improvement of this invention over Ser. No. 890,998.

BRIEF DESCRIPTION OF THE DRAWINGS

These and other objects and advantages of this invention and a better understanding of the principles and details of the invention will be evident from the following description taken in conjunction with the appended drawings, in which:

FIG. 4 illustrates the forces acting on an airfoil system mounted on an arm of the VAWT.

FIGS. 5 and 6 illustrate the construction of a VAWT having four radial arms spaced in a horizontal plane at 90° to each other. This VAWT utilizes the improved airfoil construction of this invention.

DESCRIPTION OF THE PREFERRED EMBODIMENT

Figure 1:
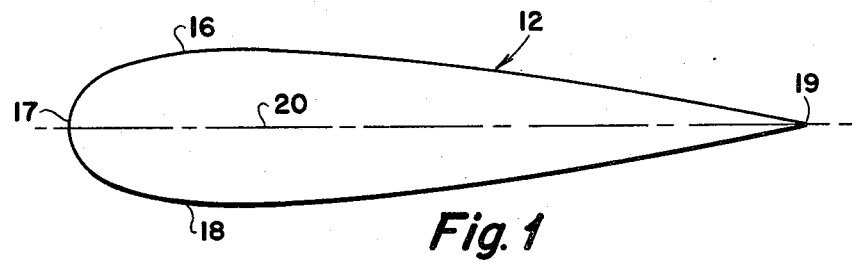
FIGS. 1 and 2 show airfoil and streamline cross-sections of the airfoil spars and of the rotor arms respectively.
Figure 2:
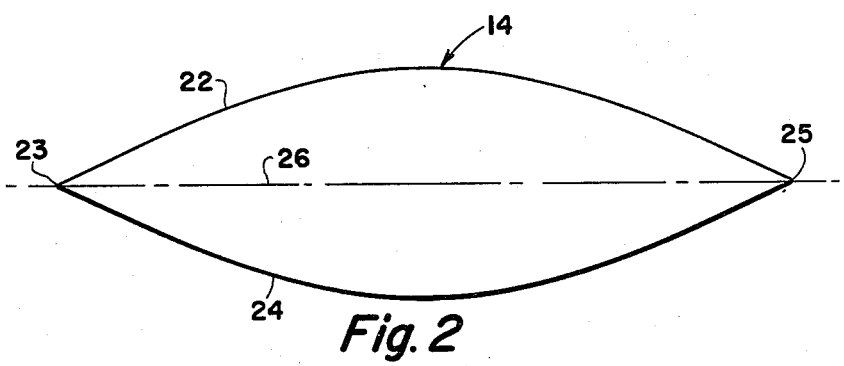

Referring now to the drawings and in particular to FIGS. 1 and 2, there are shown respectively, the cross-section 12 of the airfoil in the oval ring airfoil system, and the cross-section 14 of the streamlined arms of the rotating assembly.

The airfoil section of FIG. 1 is symmetrical about the central axis or plane 20, and has upper surface 16 and lower surface 18, which are mirror images of each other. The blunt leading edge is 17, and the sharp trailing edge is 19. The long axis of the airfoil 12 is perpendicular to the plane of the drawing.

From elementary considerations it will be seen that any horizontal beam or strut in the rotating portion of the vertical axis wind turbine (VAWT) or vertical axis windmill (VAWM) will, if near the axis of rotation encounter a relative air flow which cyclically reverses in direction. Such a beam or strut, as well as any circumferential support ring, should therefore have a cross-section similar to the bi-directional symmetric streamlined form shown in FIG. 2. This shape is identified by the numeral 14 and has a convex top 22, and bottom convex surface 24, both of which are symmetrical about the plane 26 which represents the central plane or chord. Flexural strength against bending and torsion forces can, of course, be provided by means of suitable load bearing structural members located inside of this bidirectional streamlined covering or fairing, 22, 24.

This VAWT system is based on the Darrieus principle, that at the end of an arm reaching horizontally from a vertical axis of rotation, a long, thin symmetrical airfoil is attached to extend upwardly and/or downwardly with its chord perpendicular to the axis of the arm, and with its leading edge facing tangentially forward. Thus, the airfoil is moved continuously around in a circular path at high speed. The effect of any wind of constant direction will be to deliver energy into the arm in the form of cyclic torque pulses.

If the circumferential speed V of the airfoil is significantly more than the wind speed W, the effective angle of attack of the moving airfoil will vary sinusoidally between plus and minus W/V radians. The corresponding tangential component of lift minus the airfoil drag is the useful force extracted from the wind.

The airfoil shape giving a good lift-to-drag ratio, for this purpose, is one of approximating the NACA-0020 airfoil, which is shown in FIG. 1. A thinner airfoil, such as the NACA-0015, could also be used. The top surface 16 and bottom surface 18 are symmetrical about the plane 20 of the chord. The blunt end 17 faces in the direction of rotation and sharp end 19 trails.

The main difficulties encountered in earlier attempts to implement the Darrieus rotor concept have been in devising functionally adequate airfoil suspension and rotor support structures.

In the copending Application 890,998, the airfoil spar has a chord which lies in a vertical plane. It is attached to the arm by means of a U-shaped attachment where the arms of the U are positioned at ¼ of the length of the spar from each end. By this means a stiffer support is provided for the spar so that the bending due to centrifugal forces will be minimized. However, there are still portions of the spar which are cantilevered outwardly and are therefore susceptible to bending, and so on.

This invention differs in the shape of the airfoil spar in which two spars are utilized, both of which are curved into identical arches. One of the spars is attached at its midpoint to the end of the arm with the concave surface directed outwardly. The second spar is mounted with its convex surface directed outwardly, and is attached with its upper and lower ends rigidly fastened to the corresponding upper and lower ends of the inner spar. This construction is indicated in a very simple form in FIG. 3, where the arm is represented as a flat strip 14 and each of the airfoil sections are indicated as curved flat strips, the inner airfoil spar being identified by the numeral 12' and the outer airfoil by the numeral 12". The two airfoil spars are attached along the upper edge 39 and the lower edge 40.

Figure 3:
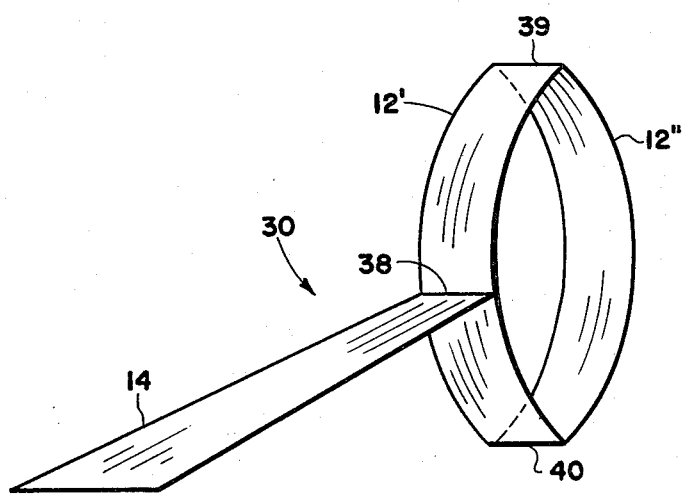
FIG. 3 illustrates the construction of the arm and the airfoil systems in line construction.

Mathematical analysis of the structure of FIG. 3 rotating about a vertical axis at the inner end of the arm 14, indicates that this particular arch construction provides a continuing support for the cantilevered portions of the spar 12', for example, so that a restraining tension member such as 70A attached to the top edge 39 provides an inward force on the spar assembly to cancel the outward centrifugal force on the entire assembly, when combined with a similar tension member 70B correspondingly attached to the lower edge 40 of the junction between the inner and outer airfoil spars. This is shown in FIG. 4.

A distinguishing feature of the rotor design is that in each airfoil system of two spars, the longitudinal axis of which extends perpendicular to the cross-section shown in FIG. 1, is curved in the form of an arch of a particular curvature. The curve shape of the arch is chosen so that the strong centrifugal forces which act on the various longitudinal elements comprising the airfoil system produce no bending moments in the spar.

In other words, the particular shape of the arch, $dr/dz$ (where r is the radial dimension of an element of the spar, and z is the direction of the vertical axis of rotation) is such that there is no tendency of the centrifugal forces to change that shape.

The two airfoil segments shown in FIGS. 3 and 4 together are called an oval ring airfoil system, the major axis of which is vertical and the minor axis of which is a radial extension of the axis of the horizontal beam 14.

In FIG. 4 the tapered cross-beam, or radial beam, 14 extends radially outwardly from a pinned attachment of a hub 46, to a vertical shaft 42, which is supported in a bearing 44; the bearing is of a conventional design, which can take the thrust of the weight of the rotating assembly, as well as guide it in a radial direction. The attachment of the beam 14 to the outwardly curved inner airfoil spar 12' is along the line 38, which is properly faired to provide smoother air flow over the system. Each of the airfoil spars are curved through an angular range of approximately 60°, so that the air space between the two airfoils has the oval lens shape profile from which the assembly gets its name, oval ring airfoil system.

The design as shown in FIG. 4 of the rotor arm is such that the centrifugal forces of rotation are supported by spanwise compression in the curved spar of airfoil 12', and spanwise tension in the curved spar of airfoil 12". Methods for calculating the shapes of the curve structure to avoid bending moments, in supporting distributed loads, are well known in the civil engineering arts, particularly in bridge design. The compressive and tensile forces at the upper junction 39 of the two airfoils, are represented by the vectors C and T respectively. The vector sum of C and T is denoted by R, and its oppositely directed counterforce is denoted by the arrow P.

An important feature of the two airfoils 12' and 12" is that their spar curvatures and spanwise linear densities are structured so that the upper and lower counterforce vectors P and P' are directed radially inwardly, and perpendicular to the length of the airfoil spars, and also perpendicular to the vertical axis of the shaft 42.

Figure 6:
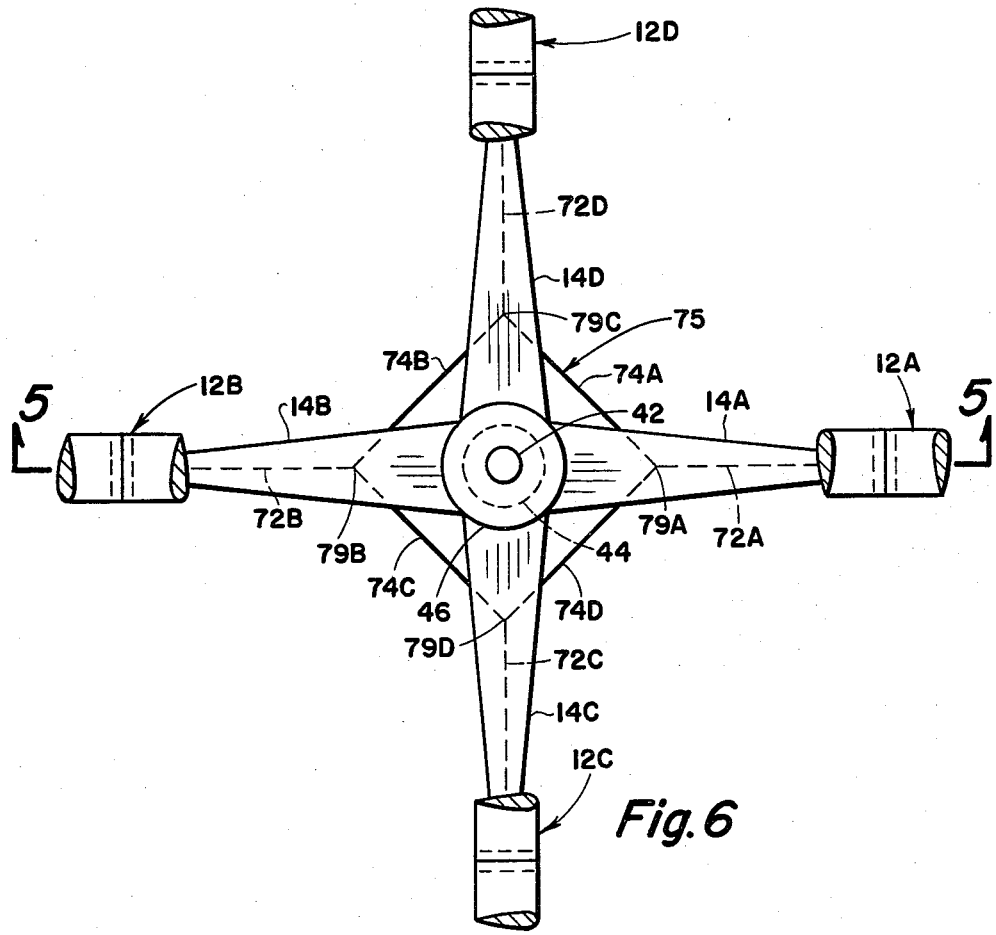

In the specific embodiments described in FIGS. 5 and 6, the counterforces P and P' are to be furnished by centrifugal restrain cables, or tension members, 70A and 70B at the top junctions 39 of the spars, and tension members 72A and 72B respectively at the bottom junctions 40, of the spars. In this way the cross-beam arms 14A and 14B furnish the principal aerodynamic thrust and gravitational counter-forces.

The complete rotor assembly mounted on a suitable tower structure is shown in FIGS. 5 and 6. The tower essentially comprises a base 82, resting on the surface 81 of the earth. There is a base centered housing 80 in which an energy converter such as an electrical generator, or other system, for utilization of the rotating energy of the shaft 42 is located. The structure may have three or more legs 46 with cross-supports, etc., as are well known in the art. The structure has a top bearing 44 of conventional design which supports the weight of the rotor and also guides rotation of the drive shaft, or power output shaft 42. The tower may have a tubular housing surrounding the rotary shaft 42. The axis of the shaft is 43.

In the embodiment shown in FIGS. 5 and 6, as an example, a rotor having four radial arms is illustrated. The plan view shows each of the arms to be substantially identical and the airfoil assemblies on each of the arms are also identical.

As a matter of choice, a number of arms equal to four has been chosen, although this is no limitation on the invention, and two, three, four or more arms could be used as desired. Each cross-beam or arm 14 extends from a central hub 46. All arms are in a common horizontal plane.

Referring to FIG. 5, it is seen that each pair of airfoils 12A' and 12A", and 12B' and 12B", has cable eyelets 80A and 80B respectively at their tops and 80A' and 80B', respectively, at their lower junctions 40.

A four leg pedestal 48 is mounted on top of the hub 46 as a vertical extension of the shaft 42. It extends upwardly to hold an end plate 78, in the center of the rotor circle at the same level as the upper eyelets 80A and 80B, etc. Directly above each cross beam 14A, 14B, a centrifugal restraint tension member, or cable 70, extends radially inwardly from the upper eyelet 80 to a corresponding eyelet attached to the end plate 78. In this manner the upper junctions of the airfoil pairs are held in radial position by an upper spider array of four cables radiating outwardly from axially centered end plate 78.

In a similar manner, a lower spider array of four cables 72A, 72B, 72C, 72D holds the lower junctions of the four airfoil pairs in radial position. These are not tied to the central shaft but to an open central square 75 of 4 cables, which avoids interference with the tower structure. In other words, there are four equal length cables 74A, 74B, 74C and 74D which surround the tower structure and at the corners of this square 75 the inner ends of the radial tension members 72A, 72B . . . are attached, to provide the necessary radial restraint on the bottom ends of the airfoil assemblies.

FIG. 6 illustrates a downward view from a point directly above the rotor shaft, with the rotor cut by a horizontal plane located just above the cross-beams. A comparison of FIGS. 5 and 6 further emphasizes the relationship of the tapered cross-beams 14 and the associated pairs of airfoils 12' and 12". It is also seen that the lower restraint cables 72 attached to the lower eyelets 80A' extend radially inwardly only far enough to reach a connecting link 79A, 79B, 79C, and 79D, at each of the four corners of the cable square 75 made of the cables 74. Being light in weight, the central square 75 of the lower spider array can easily be supported by the natural sag in each component radial cable 72. Alternatively, each link 79 may be held in vertical position by means of a thin auxiliary cable extending upward from the links 79 to an attachment to the underside of the respective cross-beam 14.

Referring again to FIG. 5, the restraint cables or tension members 70A, 70B, 72A, 72B, etc., as shown in FIG. 5 are the preferred arrangement of cables. The cables are truly radially connected to the central support 78 and to the eyelet 80A, 80B, etc. Similarly, for the bottom cables 72A, 72B, etc.

Figure 7:
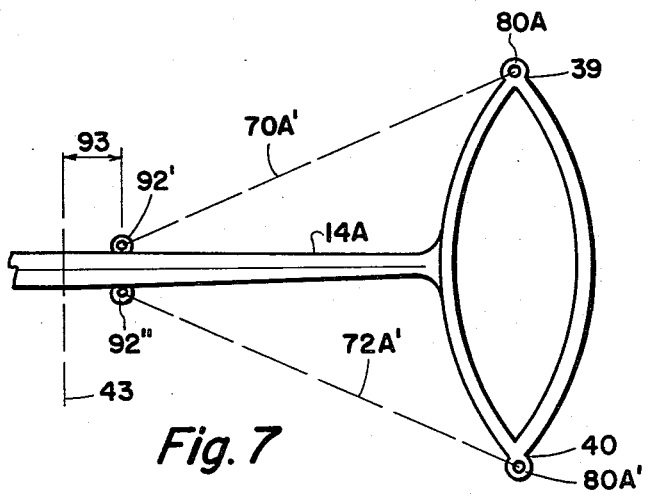
FIGS. 7, 8, 9, 10, and 11 show various modifications of the structure of the rotating arms and airfoil systems illustrated in FIGS. 4, 5, and 6 employing some of the features of U.S. Pat. No. 4,204,805.

However, it may be convenient to provide a tension member as shown in FIG. 7, which connects from the eyelet 80A on the top edge 39 of the airfoil assembly, and like dashed line 78' connects at its other end to an eyelet 92' attached to the upper surface of the arm 14A at a selected distance 93 from the axis of rotation 43. Similarly the bottom cable can, like dashed line 72A' be connected to eyelet 80A', at its outer end, and to eyelet 92" attached to the lower surface of the arm 14A, at distance 93 from the axis of rotation 43.

Figure 8:
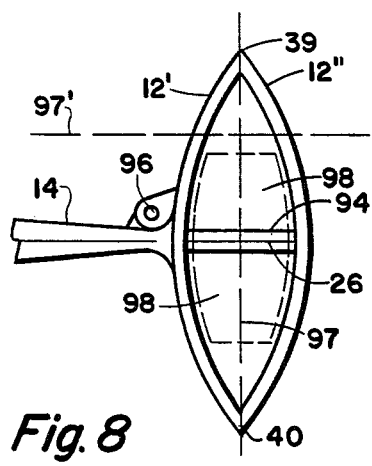

Referring now to FIG. 8, there is a modification of the junction mechanical structure joining the end of the arm 14 to the inner curved spar 12'. This is in the form of a horizontal axis of rotation 96. This corresponds to FIG. 9A of Ser. No. 890,998, with which the spar can be rotated counterclockwise through an angle of 90° about the axis 96, so that the cord 97 of the airfoil assembly 12 is now horizontal, 97'. The airfoil now is feathered and would have no torque generating capability. The action of this type of junction is fully described in the copending application Ser. No. 890,998.

FIG. 8 also indicates another possible modification of the airfoil assembly 12' and 12". This involves a streamlined spar 94, in a horizontal position, with its cord in the horizontal plane 26 of the arm 14, and is firmly attached to the inner surfaces of both of the arched airfoils 12' and 12". This provides additional stiffening of the spars and may be used without disadvantage.

There is another way in which that spar 94 shown in FIG. 8 may be used. That would be as a wind brake, in the same manner as the vane 60 of FIGS. 4A and 5A of the Ser. No. 890,998. When turned in the manner shown, it would present a minimum of disturbance to the air flow, and a minimum braking. When it is rotated 90° with its plane vertical, shown by dashed outline as surface 98, it would present a substantial braking surface.

Figure 9:
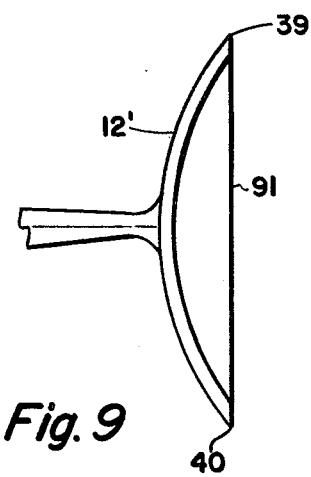

Referring now to FIG. 9, a modification of the airfoil of FIGS. 4, 5, is shown, in which the outer spar 12" is removed, and in its place is substituted a pair of vertical tension cables 91, one mounted near the forward edge of the spar, and the other mounted near the trailing edge of the spar. These tension cables 91 in conjunction with the tension cables 70A and 72A, for example, or 70A' and 72A' of FIG. 7, would fully support the top and bottom edges of the airfoil 12'.

Figure 10:
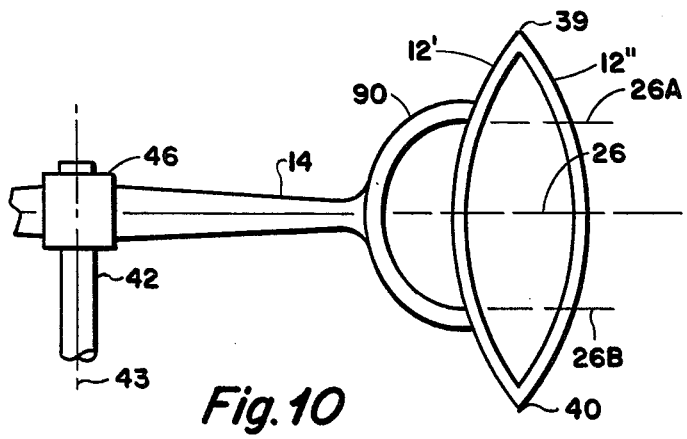

Referring now to FIG. 10, there is shown still another modification of the arm and airfoil assembly, in which the arm 14 is shortened, and there is inserted between the end of the arm 14 and the outer surface of the airfoil spar 12' a U-shaped semi-circular bracket 90, which is rigidly attached to the arm 14 and to the outer surface of the spar 12'. The two arms of the U are attached to the spar 12' at points 26A and 26B which are $\frac{1}{4}$ of the length of the spar from the upper edge 39 and the lower edge 40 respectively. In this way the amount of cantilevered surface beyond the support points of the bracket 90 is minimized, and therefore, the spars are subject to reduced bending forces. This construction is fully described in co-pending application Ser. No. 890,998.

Figure 11:
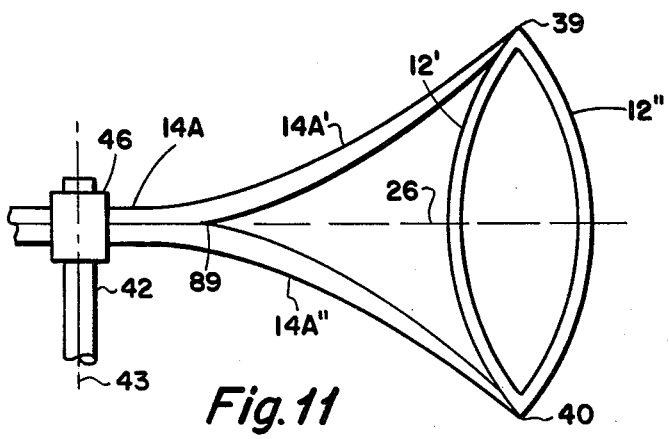

Referring now to FIG. 11, there is shown a still further modification of the arm support for the oval ring airfold systems 12' and 12", previously described. In this case the arm 14A is divided about its central plane 26, into two thinner arms 14A' and 14A", which are bent outwardly on a curved, or linear, form, from a junction point 89 to the top and bottom edges 39 and 40 respectively. In this way the combination of the radial arms and the tension members 70A' and 72A' of FIG. 7, are combined in a single rigid triangular structure which provides greater rigidity to the entire rotating assembly.

Throughout the full description, the principal embodiment and the modifications are all combined in a basic design, including that shown in copending application Ser. No. 890,998, in which the center of useful aerodynamic pressure, the center of rotation, and the main bearing support are all located at the same physical point in the support structure.

While the arched shape of the airfoils 12' and 12" are described without fully specifying the precise shape, it can be shown mathematically that the precise shape can be determined, not only for the arched airfoils 12' and 12", but also for the split curved arms 14A' and 14A" (of FIG. 11) by solution of an appropriate set of differential equations.

Specifically, with r denoting radial distance from the rotor axis, with z denoting height above the horizontal midplane of the rotor, and with r(z) denoting the curved spar shape, it can be shown that $$\frac{d^2 r}{dz^2} = \frac{\rho w^2 r}{K} \cdot \sqrt{1 + \left(\frac{dr}{dz}\right)^2}$$

in which w is the angular velocity of the rotor, and $\rho$ is the spanwise linear mass density of the airfoil. The constant K is the vertical component of the spanwise compressive force in the outwardly concave spar. In the outwardly convex spar K is negative, in order to denote tensile force.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A vertical axis windmill comprising:
   (a) a tower structure supported on the earth; a vertical shaft supported inside said tower structure from a bearing means at the top of said structure;
   (b) a rotating structure having a central hub, rotating on said bearing means and connected to said shaft, said structure comprising at least two radial arms extending from said hub, the axes of said arms circumferentially equally spaced, in the same horizontal plane;
   (c) an oval ring airfoil system or assembly, attached symmetrically to the outer ends of each of said arms, each of said airfoil systems oriented with its major axis in the vertical direction; and wherein
   (d) the inertial center, the aerodynamic center, and the support center are all positioned at the center of rotation of said rotating structure; and in which each of said oval ring airfoil assemblies comprises two identical arched spars, the curvature of said arches designed such that there is no tendency for the curvature to change under a uniformly distributed centrifugal force being applied along the lengths of said spars, said spars are connected together at the top and bottom edges, with their concave surfaces facing each other; the center of the outer surface of one spar attached to the end of one arm.

2. The windmill as in claim 1 in which the top and bottom ends of each of said airfoil systems are supported by tension means positioned in vertical planes through each of said arms.

3. The windmill as in claim 1 in which each arm is streamlined, with its chord plane being horizontal.

4. The windmill as in claim 1 in which there are more than two radial arms and oval ring airfoil systems.

5. The windmill as in claim 1 in which said tower structure rests on a base, the diameter of said base being no larger than the diameter of rotation of the vertical axes of said oval ring airfoil systems.

6. The windmill as in claim 1 in which said tower structure comprises a vertical cylindrical tube supported on a base, and guyed to said base by means attached to the tower below the said top bearing.

7. The windmill as in claim 1 including lockable hinge means between the end of each arm and its oval ring airfoil systems whereby the vertical airfoil can be rotated into a feathered position.

8. The windmill as in claim 7 in which the axis of said hinge is horizontal.

9. The windmill as in claim 1 including at least one start-up vane attached to the underside of each streamlined radial arm.

10. The windmill as in claim 1 including at least one overspeed braking vane attached to each subassembly comprising one arm and one oval ring airfoil system.

11. The windmill as in claim 9 in which said braking vane comprises a streamlined vane hinged to said oval ring airfoil system by means of a horizontal shaft, and adapted to rotate through an angle of 90 degrees.

12. The windmill as in claim 11 in which said vane is hinged about a horizontal axis co-linear with the axis of said arm, and positioned between the two curved airfoils which comprise said assembly.

13. The windmill as in claim 2 in which said tension members connected to the top and bottom ends of each vane assembly are connected at their other ends to said arm to which said assembly is connected, at a point a selected distance from the axis of rotation.

14. The windmill as in claim 2 in which said tension members comprise flexible cables.

15. The windmill as in claim 1 in which said rotating structure comprises four radial arms positioned at 90° to each other and including an oval ring airfoil system at each outer end.

16. The windmill as in claim 2 in which said rotating structure comprises three equally spaced radial arms in a horizontal plane, and including three tension members of equal length joined together at one end, the junction positioned along an extension of the axis of rotation of said rotating structure, the other ends of said three tension members connected one to each of the tops of said oval ring airfoil systems.

17. The windmill as in claim 16 and including a set of three tension members with one end of each connected to one of the bottom edges of said airfoil systems; the second end of each tension member connected to one corner of an equilateral triangle formed of three tension members, surrounding said structure at the vertical height of the lower edge of said airfoil systems.

18. The windmill as in claim 16 in which said junction of said three radial tension members is fastened to a vertical extension of said vertical shaft.

19. The windmill as in claim 2 in which said rotating structure comprises four equally spaced radial arms in a horizontal plane, and including four tension members of equal length joined together at one end, the junction positioned along an extension of the axis of rotation of said rotating structure, the other ends of said four tension members connected one to each of the tops of said oval ring airfoil systems.

20. The windmill as in claim 19 and including a set of four tension members with one end of each connected to one of the bottom edges of said airfoil systems; the second end of each tension member connected to one corner of a square formed of four tension members, surrounding said structure at the vertical height of the lower edge of said airfoil systems.

21. The windmill as in claim 19 in which said junction of said four radial tension members is fastened to a vertical extension of said vertical shaft.

22. The windmill as in claim 1 and including between the outer end of each arm and the attached airfoil system a U-shaped connector, the two arms of the U being horizontal and in a vertical plane and attached to said curved airfoil system.

23. The windmill as in claim 22 in which the arms of said U-shaped connector are connected to said airfoil system approximately at the ¼ and ¾ points down from the top.

24. The windmill as in claim 1 and including a horizontal streamlined vane attached between the inside surfaces of said two arched airfoils of each system.

25. The windmill as in claim 1 in which said oval ring airfoil system includes one curved airfoil, attached at the center of its convex surface to the end of a radial streamlined arm, with its length in the vertical direction, and including:
a pair of tension members connected one near the leading edge and the other near the trailing edge of said airfoil, between the top and bottom ends thereof.

26. The windmill as in claim 1, in which each radial arm comprises a pair of radial arms connected together at said hub, and in the same vertical plane, said arms spreading out, one upwardly and the other downwardly and attached at their outer ends respectively to the top and bottom ends of said airfoil system.

27. The windmill as in claim 26 in which each of the arms in said pair of arms is linear.

28. The windmill as in claim 25 in which each of the arms in said pair of arms is curved, the top arm being concave upwardly, and the bottom arm being concave downwardly.

29. A vertical axis wind turbine (VAWT) comprising
(a) a support structure, including a top bearing and downwardly depending vertical shaft;
(b) a rotating assembly having a plurality of equally spaced radial arms in a common horizontal plane, each arm carrying at its outer end an oval ring airfoil assembly with each airfoil assembly extending equally above and below said arms, with its axis vertical;
(c) each of the two airfoils or spars in said assemblies identical, and comprising an arched spar, with the curvature such that under the effect of the centrifugal force being equally distributed along the length of the spar, there will be no tendency for the curvature of the spar to change; said two spars connected together at their top and bottom edges, their two concave surfaces facing each other.

30. The VAWT as in claim 29; and including a pair of tension members attached respectively to the top and bottom ends of said spars and directed radially inwardly; whereby the sum of all centrifugal forces on said spars can be countered by said tension members.

* * * * *